June 13, 1944.     J. H. BORDEN     2,351,316
MOTOR CONTROL SYSTEM
Filed Feb. 23, 1942     2 Sheets-Sheet 1

Inventor
Joseph H. Borden

June 13, 1944.　　　　　J. H. BORDEN　　　　　2,351,316
MOTOR CONTROL SYSTEM
Filed Feb. 23, 1942　　　　　2 Sheets-Sheet 2

Inventor
Joseph H. Borden

Patented June 13, 1944

2,351,316

UNITED STATES PATENT OFFICE 2,351,316

MOTOR CONTROL SYSTEM

Joseph H. Borden, Philadelphia, Pa., assignor to Atlantic Elevator Company, a corporation of Pennsylvania Application February 23, 1942, Serial No. 432,075

3 Claims. (Cl. 172—239)

This invention relates to a motor control system and its behavior under transient conditions.

An object of this invention is to provide an improved variable voltage control incorporating a small motor and generator and in which the motor armature is quickly and accurately positioned within the motor frame.

Another object of this invention is to provide an improved variable voltage control incorporating a small motor and generator and in which the motor armature responds instantaneously and substantially linearly to the magnitude of the control voltage or current.

Another object of this invention is to provide means for overcoming the sluggishness in a variable voltage control system.

The specific nature of the invention as well as other objects and advantages thereof will clearly appear from a description of a preferred embodiment as shown in the accompanying drawings in which:

Fig. 1 is a schematic drawing of a variable voltage or Ward Leonard system.

Fig. 2 discloses the disposition of windings in the generator 10 of Fig. 1 and also the vector 24 which represents cross magnetization which is due to flow of generator armature current.

Fig. 3 discloses the disposition of windings in the motor 12 of Fig. 1 and also the vector 25 which represents cross magnetization which is due to flow of motor armature current.

Fig. 4 discloses the characteristic magnetization (B—H) curve for the generator magnetic field and discloses the limits of operation for all possible values of control field and/or armature currents.

Figure 7:
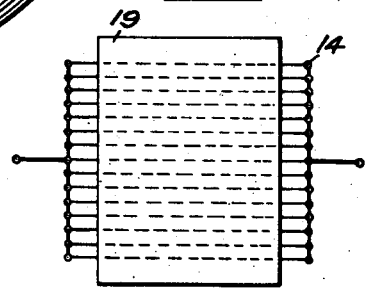
Figure 5:
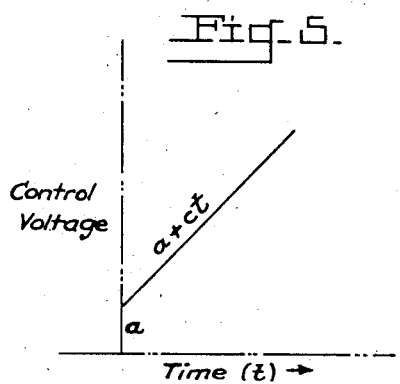
Fig. 5 is a graphic representation of the control voltage $a+ct$ which is applied to the generator control winding for the purpose of analysis.
Figure 5:
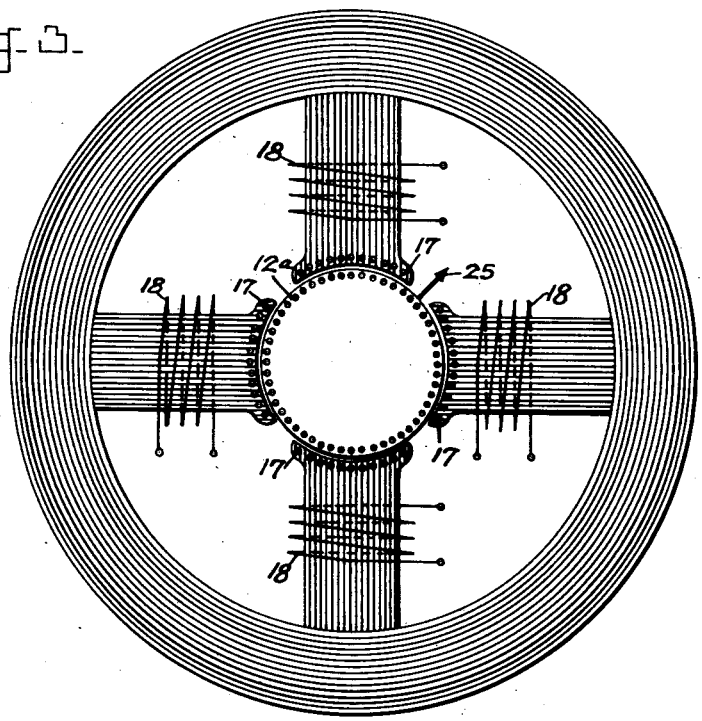

Fig. 7 represents the disposition of the pole face neutralizing winding 14 in the face of pole 19 and it is understood that the motor neutralizing winding 17 is disposed similarly in the motor pole faces.

Heretofore, variable voltage drives, commonly referred to as Ward Leonard drives, have not found favorable use in mechanisms adapted to accurately position one member with respect to another within a short time interval. This is true because of the sluggishness of the variable voltage control; this fact is one well known in the art, e. g., see page one of the Gietmann Patent 2,220,644, issued November 5, 1940. The prior art variable voltage or Ward Leonard controls were not found suitable to respond to the exacting transient control signals which are necessary in quick positioning operations. In the prior art, extraneous control elements were incorporated in the Ward Leonard system, as in the Gietmann patent, in order to compensate for the sluggishness in the system and thus make it more suitable for positioning operations.

Moreover, in most positioning systems the positioning motor need be of small dimensions and extraneous compensating means would take up useful space, and because of the smallness of the motor some difficulty would be encountered in adapting such means to the motor. The ammunition fuse setting apparatus disclosed in applicant's copending application, Serial No. 401,016 filed July 3, 1941, furnishes an example where a motor of small size is important for positioning an element within a very short time interval. This invention relates to arrangements in the variable voltage system of the type described in the above application.

In the prior art variable voltage systems there are a number of limitations which cause the driven equipment to be sluggish; in order that such sluggishness be eliminated it is necessary to understand and appreciate all the adverse factors which cause the sluggishness and to provide an arrangement wherein all of those factors are no longer reflected in the operation of the system. It is essential that all of the adverse factors be corrected simultaneously because the presence of one of the subversive factors would determine the success or failure of the variable voltage drive in effecting an instantaneous control devoid of sluggishness.

In steady state operation the speed of the variable voltage motor is for most intents and purposes practically a linear function of the excitation of its driving generator but there is a wide variance from such a relationship under transient conditions if certain precautions are not taken. This application concerns itself particularly with the behavior of a variable voltage motor system under transient conditions.

In a variable voltage or Ward Leonard system the variable voltage generator is driven at a constant speed and the voltage applied to the generator field produces a generated generator terminal voltage which is applied to the motor input terminals. It is imperative that the generator field current be instantaneously reflected on the motor input terminals in direct linear proportion to the value of the generator field current or else the variable voltage drive is not suitable for the quick positioning of driven elements unless other prior art compensating means are used.

Important considerations must be given to the condition of the generator magnetic circuit for the reasons to be discussed. The first adverse factor to be considered in the variable voltage or Ward Leonard system that causes sluggishness is due to eddy current losses in the generator field circuit; the reason for this will be apparent from the following considerations. In transient operation a voltage $a+ct$ applied to the generator field must satisfy these relationships $$a+ct=bx+e\frac{dx}{dt}+j\frac{di}{dt} \quad (1)$$

$$(\text{zero}) \; 0=j\frac{dx}{dt}+io+q\frac{di}{dt} \quad (2)$$

where $a=$constant value of voltage in generator field.
$c=$constant determining the rate of rise of generator field applied voltage
$t=$time
$b=$generator field resistance
$e=$generator field inductance
$x=$generator field current
$i=$eddy current in field structure
$j=$mutual inductance between generator field circuit and eddy current path in the field structure
$o=$resistance of eddy current path in field iron circuit
$q=$inductance of eddy current path in field iron circuit.

The following equation satisfies the differential Equations 1, 2.

$$x=A\epsilon^{-\frac{1}{2}\frac{C+L}{1-MN}t}\cosh\left\{\left(\frac{\sqrt{(C-L)^2+4CLMN}}{2(1-MN)}\right)t+\phi\right\}+\frac{a}{b}-\frac{ce}{b^2}+\frac{ct}{b} \quad (3)$$

where $$A \cosh \phi = \frac{ce}{b^2}$$

and where A is a constant depending upon boundary conditions, and where $$C=\frac{b}{e}; \; L=\frac{o}{q}; \; M=\frac{j}{e}; \; N=\frac{j}{q}$$

$\epsilon=$base of natural logarithm

For large values of L or ratio of eddy current resistance to inductance of the eddy current path Equation 3 reduces to the following form $$x=A\epsilon^{-(\frac{1}{2})(Lt)}\cosh\left(\frac{Lt}{2}+\phi\right)+\frac{a}{b}-\frac{ce}{b^2}+\frac{ct}{b} \quad (3')$$

It is seen that the first transient term involving $$\cosh \frac{Lt}{2}$$

may be very large and exist at a large value during a relatively long period of time if exacting precautions are not taken to reduce the eddy current flow to the smallest value possible.

Also by making the ratio of inductance to resistance relatively low in the generator field circuit, the value of generator field current will be equal to $$x=a/b+\frac{ct}{b}$$

after a relatively short interval of time.

In order that the field magnetizing current rise rapidly it is apparent that the eddy current flow in the field circuit be made small by suitably laminating the generator magnetic circuit; also the inductance of the generator field should be made small in relation to the resistance in the field circuit.

Although the value of the generator field inductance should be low as seen from the above Equation 3, sufficient iron should be present in the generator field so as to prevent magnetic saturation of the generator field circuit. A second adverse factor in the prior art systems resides in the non-linear relationship between generator flux and generator field current, which non-linear relationship is due to magnetic saturation of the iron in the field circuit. It must be remembered that in the prior art Ward Leonard arrangements the purpose of having a series field in the generator was to introduce a voltage in the generator armature circuit proportional to the generator armature current so as to compensate for the IR drop in the generator and motor armature circuits for the various values of armature current. However, since the generator field was energized due to two causes, i. e., the presence of armature current and the presence of field current, and since both of these currents were variable the iron in the field circuit would become or approach its saturation condition at the higher values of armature and/or field current. One of the outstanding characteristics of a system designed in accordance with the teachings of this invention is that the iron in the generator field circuit be operated along its linear characteristic for all possible values of armature and/or field currents. In the prior art arrangements, due to saturation effects in the generator field, in order to obtain series field compensation for the load current more series turns would be required on the generator field in order to operate at maximum voltage than required when operating at minimum voltage and this is necessarily true also to a degree in transient operation. This would mean that in order to obtain series field compensation for the load current more series turns would be required on the generator field in order to operate at maximum voltage than required when operating at minimum voltage; this of course is impracticable in transient operation since there is no simple method of changing these turns at the proper time. A mathematical analysis of the effect of magnetic saturation in the generator field circuit is given below.

Figure 6:
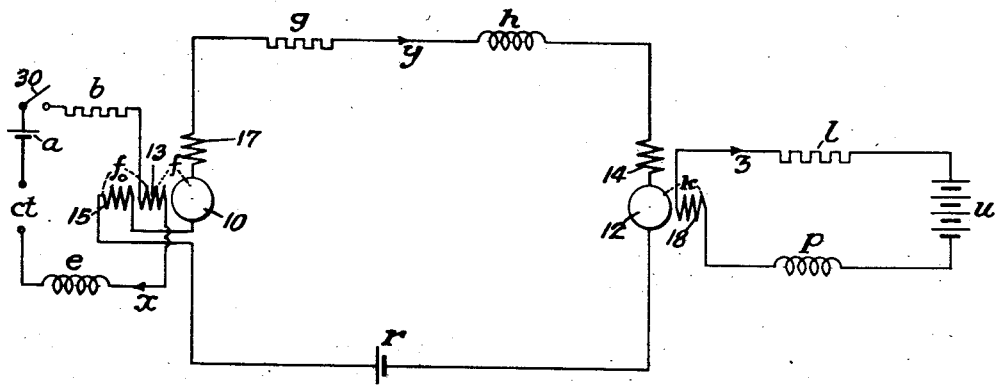
Fig. 6 represents an equivalent electrical circuit for the variable voltage or Ward Leonard system and is helpful in the mathematical analysis of this type of system.

In addition to the above two discussed adverse factors, i. e., eddy currents in the generator field and saturation in the generator field, a third adverse factor to linear behavior of a variable voltage or Ward Leonard control resides in the fact that the generator armature current causes a field which is disposed in space 90° out of phase with the main fields, and when the armature current field changes in transient operation a voltage is induced in the generator field circuit whose effect is to produce a lag of the current in the generator armature circuit behind the voltage applied to the generator field terminals. This secondary phase displaced field which is produced by the generator armature current may be considered to exert its effect on the generator control field circuit through an equivalent mutual inductance designated by $f$ in Fig. 6.

The differential equations for the variable voltage or Ward Leonard system in which the generator field extends over an eddy current free path and the generator field magnetic circuit is arranged so as to operate along the linear portion of its magnetization curve for all values of armature and/or field currents may be written as follows:

$$a + ct = bx + e\frac{dx}{dt} + f\frac{dy}{dt} \quad (4)$$

$$r + sx = gy + h\frac{dy}{dt} + f\frac{dx}{dt} \quad (5)$$

where $a$, $c$, $f$, $b$, $x$, $e$ have the values ascribed to them above and where $r$ = residual voltage in generator armature circuit due to residual magnetism in its generator field circuit.
$s$ = a constant such that the field current $x$ when multiplied by such constant will equal the generated armature voltage. $s$ is in fact a constant since the speed of the generator is constant and the magnetic field circuit is operated along the linear portion of its magnetization curve.
$g$ = resistance in generator armature circuit
$h$ = inductance in generator armature circuit
$y$ = generator armature current
$f$ = equivalent mutual inductance between the generator armature winding and the generator control field winding. This value is discussed above.

The following equations satisfy the differential Equations 4 and 5:

$$x = A' \epsilon^{-\frac{1}{2}\left(\frac{C+D+FH}{1-AH}\right)t} \cosh\left\{\left(\frac{\sqrt{(C-D+FH)^2+4DH(F+AC)}}{2(1-AH)}\right)t + \phi'\right\} + \frac{a}{b} - \frac{ceg+cfs}{b^2g} + \frac{ct}{b} \quad (6)$$

where $$A' \cosh \phi' = \frac{ceg+cfs}{b^2g}$$

and $$y = A'' \epsilon^{-\frac{1}{2}\left(\frac{C+D+FH}{1-AH}\right)t} \cosh\left\{\left(\frac{\sqrt{(C-D+FH)^2+4DH(F+AC)}}{2(1-AH)}\right)t + \phi''\right\} + \frac{r}{g} + \frac{as}{bg} = \frac{c}{bg}\left\{f + \frac{s}{C} + \frac{s}{D} + s\frac{FH}{CD}\right\} + \frac{cst}{bg} \quad (7)$$

where $$A'' \cosh \phi'' = \frac{as}{bg} - \frac{c}{bg}\left\{f + \frac{s}{C} + \frac{s}{D} + s\frac{FH}{CD}\right\}$$

If the effect of the series field is taken into account the above equations will be altered by replacing $h$ by $h'$ and $f$ by $f'$ where $h' = h + h_o$; $h_o$ being the self inductance of the series field and it is assumed there is no substantial mutual inductance between the series winding and the armature winding, and
$f' = f$ minus $f_o$; where $f_o$ is the mutual inductance between the series field winding and the control field winding.

If the equivalent mutual inductance between the generator armature winding and the generator control field winding is neutralized by means to be discussed then the differential Equations 4, 5 take the following form $$a + ct = bx + e\frac{dx}{dt} \quad (8)$$

$$r + sx = gy + h\frac{dy}{dt} \quad (9)$$

The solution of differential Equations 8, 9 give the following equations $$x = \frac{ec}{b^2}(\epsilon^{-Ct} - 1) + \frac{a}{b} + \frac{ct}{b} \quad (10)$$

$$y = (1 - \epsilon^{-Dt})\left\{\frac{sa}{bg} - \frac{sc}{bg}\left(\frac{1}{C} + \frac{1}{D}\right)\right\} + \frac{r}{g} + \frac{cst}{bg}$$

$$+ \frac{sc}{bg} \frac{D}{C(D-C)}\left\{2\epsilon^{\frac{-(C+D)}{2}t} \sinh\frac{D-C}{2}t\right\} \quad (11)$$

where $D = g/h$; $C = b/e$, or $$y = A''' \epsilon^{-\left(\frac{C+D}{2}\right)t} \cosh\left(\frac{C-D}{2}t + \phi'''\right) + \frac{r}{g} + \frac{as}{bg} - \frac{cs}{bg}\left(\frac{1}{C} + \frac{1}{D}\right) + \frac{cst}{bg} \quad (12)$$

where $$A''' \cosh \phi''' = \frac{cs}{bg}\left(\frac{1}{C} + \frac{1}{D}\right) - \frac{as}{bg}$$

$h$ may be replaced by $h'$ in these equations as well as $f$ by $f'$ if we assume there is no substantial mutual inductance between the series winding and the armature winding.

If we choose the value of $c$, the rate of rise of generator field voltage, to be of such a value that $$c = a\frac{CD}{C+D}$$

then Equation 11 becomes $$y = \frac{r}{g} + \frac{cst}{bg} + \frac{sa}{bg\left(1 - \frac{C^2}{D^2}\right)}\left\{2\epsilon^{\frac{-C+D}{2}t} \sinh\frac{D-C}{2}t\right\} \quad (13)$$

Also by making $C$ substantially equal to $D$ the last term may be made small in magnitude and of course becomes substantially zero after a relatively short time interval. For small values of $D-C$, $$\sinh\frac{D-C}{2}t = \frac{D-C}{2}t$$

and Equation 13 becomes $$y = \frac{r}{g} + \frac{cst}{bg}(1 - \epsilon^{-Dt}) \quad (14)$$

or $$y = \frac{r}{g} + \frac{sat}{2bh}(1 - \epsilon^{-Dt}) \quad (15)$$

where $D$ is substantially equal to $C$, and $$c = a\frac{CD}{C+D} = a\frac{D}{2}$$

With these two conditions it is thus seen that the current in the generator armature circuit is a linear function of time after a brief instant, and hence follows the time variations of voltage or current applied to the generator field circuit. Thus, by applying a control voltage or current to the control winding such that the rate of change of said voltage or current is related to electrical constants in the system a highly responsive system may be obtained.

If the generator field magnetic circuit is operated near the saturation region the voltage which will be induced in the generator armature circuit will not be equal to $r + sx$ as in Equation 9, but the voltage then is not a linear function of current and may be expressed by $(r + sx - \Delta x^2)$ where $\Delta$ is a constant and $r$, $s$, and $x$ have the values previously ascribed to them.

With the generator field circuit somewhat saturated and neglecting the effect of eddy currents and mutual inductance between the generator armature and field windings the following differential equations express the relationships to be satisfied.

$$a + ct = bx + e\frac{dx}{dt} \qquad (16)$$

$$r + sx - \Delta x^2 = gy + h\frac{dy}{dt} \qquad (17)$$

where $\Delta$ is a constant and expresses the degree of non-linearity in the generator magnetic field circuit.

The solution of Equations 16 and 17 give the following values.

$$x = \frac{ec}{b^2}(\epsilon^{-Ct} - 1) + \frac{a}{b} + \frac{ct}{b} \qquad (18)$$

and $$y = \left[\frac{sa}{bg} - \frac{sc}{bg}\left(\frac{1}{C} + \frac{1}{D}\right) - \frac{\Delta}{gb^2}\left\{\left(\frac{c}{C} + \frac{c}{D}\right)^2 + \left(\frac{c}{D} - a\right)^2 - \frac{2ac}{C}\right\}\right](1 - \epsilon^{-Dt}) + \frac{2\Delta c^2}{b^2 g}\frac{D}{C^2(2C-D)}\epsilon^{-\left(\frac{2C+D}{2}\right)t}\sinh\frac{(2C-D)}{2}t -$$

$$\frac{2sc}{bgC}\frac{D}{(C-D)}\epsilon^{-\left(\frac{C+D}{2}\right)t}\sinh\frac{C-D}{2}t - \frac{4\Delta c}{b^2 gC}\left(\frac{c}{C} - a - \frac{c}{C-D}\right)\epsilon^{-\left(\frac{C+D}{2}\right)t}\sinh\left(\frac{C-D}{2}\right)t +$$

$$\frac{2\Delta c^2}{b^2 gC}\frac{D}{(C-D)}t\epsilon^{-Ct} + \frac{sc}{gb^2}t + \frac{2\Delta ct}{gb^2}\left(\frac{c}{C} - a + \frac{c}{D}\right) - \frac{\Delta c^2 t^2}{gb^2} + \frac{r}{g} \qquad (19)$$

When $\Delta$ is equal to zero, Equation 19 reduces to Equation 11. The effect of magnetic saturation on the generator armature current is readily seen by noticing that some of the current values in Equation 19 vary directly as time varies, particularly the adverse component which is expressed by $$-\frac{\Delta c^2 t^2}{gb^2}$$

and others involving time as a direct multiplier. It is apparent that a quick responsive variable voltage control, in which the generator armature current varies substantially directly and proportionately to the voltage or current applied to the generator field circuit, should have incorporated therein a magnetic circuit free of any non-linearity such as that due to saturation effects.

In most all considerations of the transient phenomena in the variable voltage or Ward Leonard control the most important is the variation of the generator armature current ($y$) with respect to time since the ultimate torque on the driven or positioning motor is equal to $T = \alpha y\theta$ where $\alpha$ is a constant and $\theta$ is the constant value of flux in the magnetic field of the driven or positioning motor. In other words the torque on the motor armature shaft is directly proportional to the generator armature or motor armature current, said last mentioned currents being equal, and since the angular displacement of the motor shaft is proportional to the first power of the torque it follows that the motor shaft will travel a distance proportional to the first power of the armature current. It follows then that the armature current should be substantially directly proportional to the variation of current or voltage applied to the generator field in order that the motor armature travel predetermined distances in accordance with predetermined voltage or current variations in the generator field circuit.

Upon inspection of Equation 14 it is seen that the transient terms may be made small by making the ratio of generator field inductance to generator resistance low. This is in accordance with desiderata mentioned in connection with Equation 3.

It is apparent that some of the armature current transient components in Equation 12 may be greatly reduced or made zero by applying a graduated control voltage of a given variation to the generator field circuit, i. e., by proper choice of $c$. This is also true in Equation 19.

A fourth adverse factor effecting suitable use of the Ward Leonard or variable voltage control in positioning applications is the residual magnetism in the generator field circuit which manifests itself as the residual voltage $r$ in the generator armature circuit. The presence of the residual voltage $r$ can materially effect the "zero" positioning of the motor armature and an extraneous braking system which is responsive to electrical conditions in the control circuit is made necessary. The voltage $r$ however in this application of the invention disclosed herein is made practically zero by using the best grade of silicon steel with a silicon content of not less than three or four per cent in the generator magnetic field circuit.

A fifth adverse factor which makes the variable voltage or Ward Leonard control unsuitable for transient positioning work is that due to the reaction of the field produced by the motor armature current with the motor field windings. The motor armature current induces a field which is disposed in space 90 electrical degrees out of phase with the main fields, and the equivalent mutual inductance between the motor armature winding and motor field winding may be represented by a constant $k$. For a value of voltage $R + St$ applied in the motor armature circuit the following differential equations are applicable $$R + St = gy + h\frac{dy}{dt} + k\frac{dz}{dt} \qquad (15)$$

$$u = lz + p\frac{dz}{dt} + k\frac{dy}{dt} \qquad (16)$$

where R and S are constants and $k$, $g$, $y$, $h$, and $t$ have the values ascribed to them above and $z=$ motor field current
$u=$ constant voltage source in motor field circuit
$l=$ resistance in motor field circuit
$p=$ inductance in motor field circuit The following values of $y$ and $z$ satisfy Equations 15, 16

$$y = A'''\epsilon^{-\left\{\frac{D+E}{2\left(1-\frac{k^2}{hp}\right)}\right\}t} \cosh\left\{\left(\frac{\sqrt{(D+E)^2-4DE\left(1-\frac{k^2}{hp}\right)}}{2\left(1-\frac{k^2}{hp}\right)}\right)t+\phi'''\right\} + \frac{R}{g} - \frac{s}{gD} + \frac{St}{g} \quad (17)$$

where $$A''' \cosh \phi''' = \frac{s}{gD}$$

$$z = A^{iv}\epsilon^{-\left\{\frac{D+E}{2\left(1-\frac{k^2}{hp}\right)}\right\}t} \cosh\left\{\left(\frac{\sqrt{(D+E)^2-4DE\left(1-\frac{k^2}{hp}\right)}}{2\left(1-\frac{k^2}{hp}\right)}\right)t+\phi^{iv}\right\} + \frac{u}{.1} - \frac{Sk}{gl} \quad (18)$$

where $$A^{iv} \cosh \phi^{iv} = \frac{Sk}{gl}$$

It is apparent from Equations 17 and 18 that the larger the value of $k$, the greater and the more prolonged will be the transient terms in those equations and hence there will be a greater deviation from linearity in the system. Also, this deviation from linearity will be reflected greatly in the torque delivered to the motor armature since the motor torque is a function of the product of the motor field current and motor armature current.

It is noted that the voltage variation in the generator armature circuit took the form of $R+St$. This is not strictly true as seen from Equation 5 and accordingly Equation 20 is subject to a slight modification. It is sufficient to note however that a large value of D is preferred in order to minimize the flow of the transient components of the armature current.

It is apparent that any one of the six adverse factors including the improper choice of rate of change of the control voltage or current, discussed above, acting alone or in combination will cause a variable voltage control or Ward Leonard system to be deficient in meeting the exacting requirements necessary in a quick acting highly responsive positioning system.

These six adverse factors have been eliminated in a variable voltage or Ward Leonard drive of small physical size by:

1. Producing in the generator magnetic circuit and the motor magnetic circuit paths of high resistance to eddy current flow by laminating those field structures to exceptional high degree.
2. Providing the magnetic path in the generator field circuit with sufficient iron therein and of such a character that the magnetic path is operated in the linear position of its magnetization curve for all values of control field and/or series field currents.
3. Providing a distributed pole face winding on the generator magnetic field poles of such a nature so as to neutralize the equivalent mutual inductance between the generator field winding and the generator armature winding, said equivalent mutual inductance having as its nature the distributed flux which is due to the generator armature current and which is displaced ninety electrical degrees from the field poles and which retards the flow of armature current when the generator field voltage is increased.
4. Providing the generator magnetic field circuit of the best grade of silicon steel with not less than 3 or 4 per cent silicon whereby the residual magnetism is held to a minimum and the aging of the iron is substantially prevented.
5. Providing a distributed pole face winding on the motor magnetic field poles of such a nature so as to neutralize the equivalent mutual inductance between the motor field winding and the motor armature winding, said equivalent mutual inductance having as its nature the distributed flux which is due to the motor armature current and which is displaced ninety electrical degrees from the field poles and which makes itself objectionable by disturbing the linear relation of motor torque and motor armature current as the motor armature current is increased.
6. Providing the teaching that the rate of applied control voltage or current should be related to electrical constants in the variable voltage system.

Figure 1:
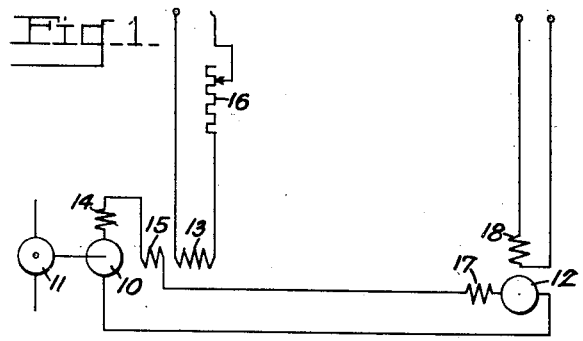

Fig. 1 discloses the general arrangement of the elements in the variable voltage or Ward Leonard control system. The elements shown in Fig. 1 are portrayed in accordance with those in Rules of Practice, United States Patent Office, February 1, 1940, but it is understood that the compensating windings in both the generator and motor fields are not solely compensating windings but are neutralizing windings and partake of pole face windings as indicated in Figs. 2 and 3, respectively; and the particular degree of compensation is as outlined above, i. e., primarily to neutralize the equivalent mutual inductance between the generator armature winding and its field winding and also the mutual inductance between the motor armature winding and its field winding.

Referring to Fig. 1 generator armature 10 is adapted to be driven at a constant speed by motor 11. Generator armature 10 feeds motor 12 in accordance with variations in generator control field 13, suitably produced by variable resistor 16; these elements are the main operating parts of the variable voltage or Ward Leonard system.

Generator armature 10 is provided with the neutralizing winding 14 and may be provided with a series field 15. Motor armature 12 is provided with neutralizing winding 17 and shunt or separately excited field winding 18. Both the field poles and frame of generator and motor are laminated to as high a degree as consistent with the minimum structural strength which these members must possess, or at least sufficient to reduce the flow of eddy currents to a negligible value.

Figure 4:
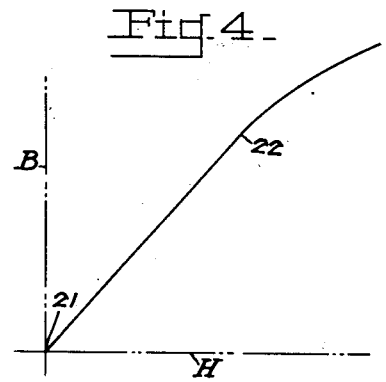
Figure 2:
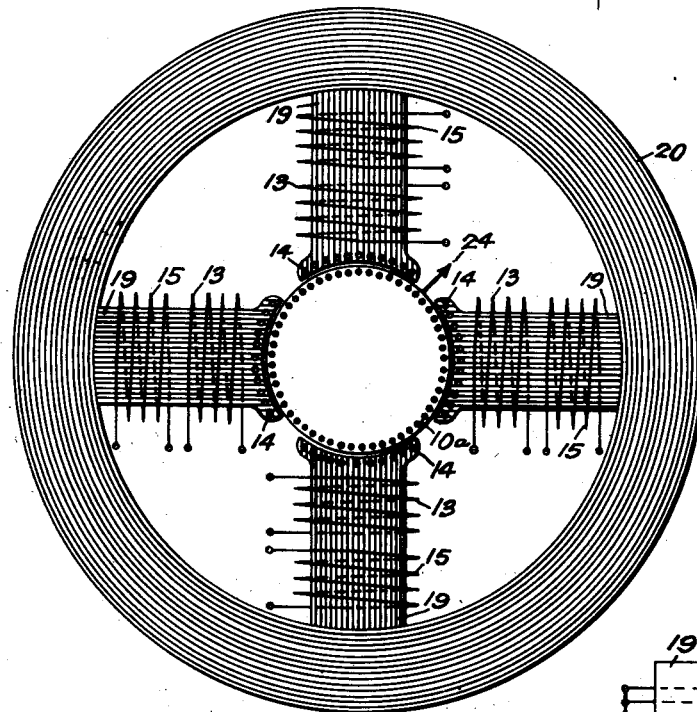

Fig. 2 discloses the arrangement of the neutralizing windings 14 in the pole faces of well laminated field poles 19. The outer ends of the diagrammatic field poles 19 are interconnected by a well laminated structure 20 so as to provide a return path for the magnetic flux. Special precautions which are well known in the art are taken to make all possible eddy current paths of high resistance. The magnetic field structure has sufficient high quality iron of low magnetic retentivity so that magnetization occurs along the linear portion of the characteristic magnetization curve for all possible currents or combination of currents in the composite generator. Fig. 4 indicates this range of operation; 21, 22 indicate the limits of operation.

It is noted that the control winding 13 has voltages induced therein when the armature current changes due to the mutual inductance between the series winding 15, if a series winding is used, and winding 13, and also between armature winding 10a and winding 13. The flux set up by the armature winding 10a is distributed in intensity but as is well understood in the art may be represented by a vector 24 which extends radially from the armature and which is displaced 90 electrical degrees from the longitudinal direction of the main field poles. It is understood however that the vector 24 represents the sum of a plurality of smaller components because of the non-uniformity of current density in the armature 10a; therefore a distributed winding such as the pole face winding 14 would be more effective than lumped windings similar to interpole windings in counteracting mutual inductance effects between conductors 10a and winding 13. Neutralizing winding 14, of course, may have all or only a portion of the generator armature current passing therethrough; hence by making the strength and direction of the flux from winding 14 of appropriate value, the effect of armature reaction flux on control winding 13 may be neutralized.

The neutralizing pole face winding 17 in the motor field serves to neutralize any mutual inductance effect between motor armature winding 12a and field winding 18. The magnetic circuit for the motor is of similar structure as that of the generator magnetic circuit.

It is true that the neutralizing windings 14, 17 enhance the commutation characteristics of the motor and generator and decrease sparking at the commutator brushes; this is of course desirable but incidental since the primary function is to make the action of the control winding independent of the armature current under transient conditions. Thus, the value of $f$ in the equations above would be zero and accordingly the control system would approach linearity and be more highly responsive to variations in the control voltage. When a series winding is used, $f'$ in the equations above would not be zero but still optimum response conditions would be obtained.

It is apparent that for a given size machine it is preferable to have a large number of poles, in which case the various windings are more closely spaced and thus it becomes easier to realize those desired coupling conditions between the various windings of the generator and motor. By the same token it is apparent that small machines lend themselves more easily to a design wherein the above mentioned coupling conditions are realized; this is rather fortunate because the usual positioning motor need be only of small size.

As a result of the arrangements described herein which eliminate the various lags of the prior art variable voltage or Ward Leonard systems the speed and torque of the motor is always a direct substantially linear function of the current in the generator field coils and is independent of the load on the system. With these arrangements a system is disclosed which is ideally suited to positioning control, particularly where a high speed of response is necessary. By applying proper graduated control to the generator field as indicated by the various values of $c$ (the rate of rise of applied field voltage) a highly responsive servo-mechanism is obtained.

The generator field current or control current may be of low value because of the non-saturated condition of the generator magnetic field circuit, and the generator (and motor) may be designed with a small air gap because of the benefits obtained from the pole face windings.

It is noted that the value $c$ has a direct relation to $a$, the initial or steady state value of voltage in the generator control circuit; accordingly the value $c$ may be changed by changing the value of $a$. The particular design incorporated herein allows quite a large range of values, $a$, to be applied since the generator iron is worked below the saturation region and the neutralizing winding in the pole faces allow a small air gap design. While optimum response will be obtained by the simultaneous application of all the teachings herein disclosed, it is obvious that improved response will be obtained by the application of any one of these teachings or group thereof.

I claim:

1. In a rapid responsive control system a dynamoelectric machine having a control winding and an armature winding, the time constant of the control winding being substantially equal to the time constant of the armature winding, and means for applying a transient voltage to the control winding equal to $$a\left(1+\frac{D}{2}t\right)$$

where $a$ is the steady state value of voltage across the control winding, D is the time constant of either winding and $t$ is time to the steady state value of voltage across the control winding.

2. A rapid responsive variable voltage system comprising a dynamoelectric generator feeding a motor, an armature winding and a control winding in said generator, the time constants of said armature winding circuit and control winding circuit being substantially equal, means for applying a transient control voltage to the control winding equal to $$a\left(1+\frac{D}{2}t\right)$$

where $a$ is the steady state value of voltage across the control winding, D is the time constant of either winding and $t$ is time, an armature winding and a field winding in said motor, and a neutralizing winding in said motor responsive to armature current and arranged to neutralize the mutual induction effects of the motor armature winding on the motor field winding.

3. A rapid responsive variable voltage system comprising a dynamoelectric generator feeding a motor, an armature winding and a control winding in said generator, the time constants of said armature winding circuit and control winding circuit being substantially equal, means for applying a transient control voltage to the control winding equal to $$a\left(1+\frac{D}{2}t\right)$$

where $a$ is the steady state value of voltage across the control winding, D is the time constant of either winding and $t$ is time, a neutralizing winding in said generator responsive to armature current and arranged to neutralize the mutual induction effect of the generator armature winding on the generator control winding, an armature winding and a field winding in said motor, and a neutralizing winding in said motor responsive to armature current and arranged to neutralize the mutual induction effects of the motor armature winding on the motor field winding.

JOSEPH H. BORDEN.